(12) United States Patent
Hu et al.

(10) Patent No.: US 12,601,582 B2
(45) Date of Patent: Apr. 14, 2026

(54) DETECTION SYSTEM, COMPENSATION METHOD, AND COMPUTER READABLE MEDIUM FOR SEMICONDUCTOR SURFACE MORPHOLOGY

(71) Applicant: CHROMA ATE INC., Taoyuan City (TW)

(72) Inventors: Hao-Chiang Hu, Taoyuan City (TW); Wei-Che Chang, Taoyuan City (TW); Ming-Kai Hsueh, Taoyuan City (TW); Chia-Hung Lin, Taoyuan City (TW)

(73) Assignee: CHROMA ATE INC., Taoyuan City (TW)

( * ) Notice: Subject to any disclaimer, the term of this patent is extended or adjusted under 35 U.S.C. 154(b) by 119 days.

(21) Appl. No.: 18/824,998

(22) Filed: Sep. 5, 2024

(65) Prior Publication Data

US 2025/0172379 A1 May 29, 2025

(30) Foreign Application Priority Data

Nov. 29, 2023 (TW) ................................. 112146406

(51) Int. Cl.
| | |
|---|---|
| *G01B 9/02* | (2022.01) |
| *G01B 9/02015* | (2022.01) |
| *G01B 9/02055* | (2022.01) |
| *G01B 9/04* | (2006.01) |
| *G01B 11/06* | (2006.01) |
| *G06N 3/045* | (2023.01) |

(52) U.S. Cl.
CPC ....... *G01B 9/02084* (2013.01); *G01B 9/0203* (2013.01); *G01B 9/02067* (2013.01); *G01B*
*11/0608* (2013.01); *G06N 3/045* (2023.01); *G01B 9/04* (2013.01); *G01B 2210/56* (2013.01)

(58) Field of Classification Search
CPC .............. G01B 9/02084; G01B 9/0203; G01B 9/02067; G01B 11/0608; G01B 9/04; G01B 2210/56; G06N 3/045
USPC ......................................................... 356/496
See application file for complete search history.

(56) References Cited

U.S. PATENT DOCUMENTS

| | | | | |
|---|---|---|---|---|
| 2020/0251213 A1* | 8/2020 | Tran | ........................ | G06N 20/20 |
| 2021/0325482 A1* | 10/2021 | Setegn | ..................... | A61B 5/05 |

* cited by examiner

*Primary Examiner* — Md M Rahman
(74) *Attorney, Agent, or Firm* — WPAT, PC

(57) ABSTRACT

Provided are a detection system, compensation method and computer-readable recording medium applicable to semiconductor surface morphology to provide feature information corresponding to spectral signals to a neural network model and provide feature information corresponding to spectral signals, a detected height, and an actual height actually measured to another neural network model. The combinational neural network models thus trained and built can generate a compensation value for a to-correct height corresponding to a to-correct spectral signal having variability. The compensation value provides required compensation for height information to not only enhance the precision of the detection of semiconductor surface morphology but also enhance the reliability of the detection system.

17 Claims, 6 Drawing Sheets

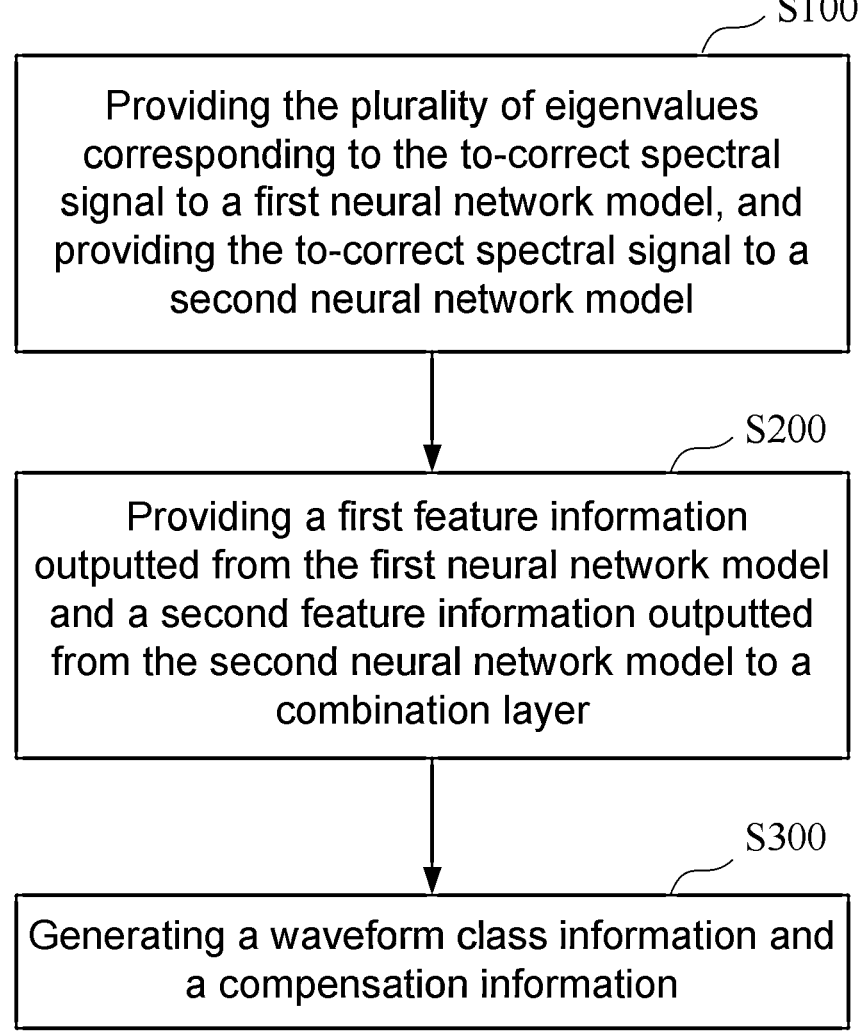

S100

Providing the plurality of eigenvalues corresponding to the to-correct spectral signal to a first neural network model, and providing the to-correct spectral signal to a second neural network model

S200

Providing a first feature information outputted from the first neural network model and a second feature information outputted from the second neural network model to a combination layer

S300

Generating a waveform class information and a compensation information

Fig. 4

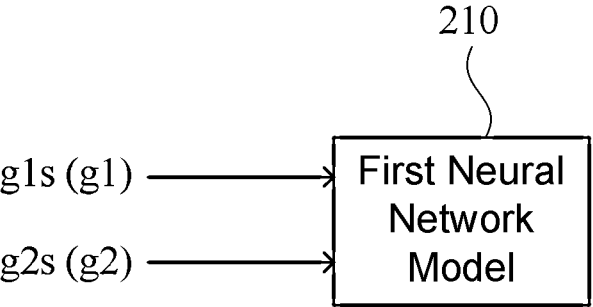
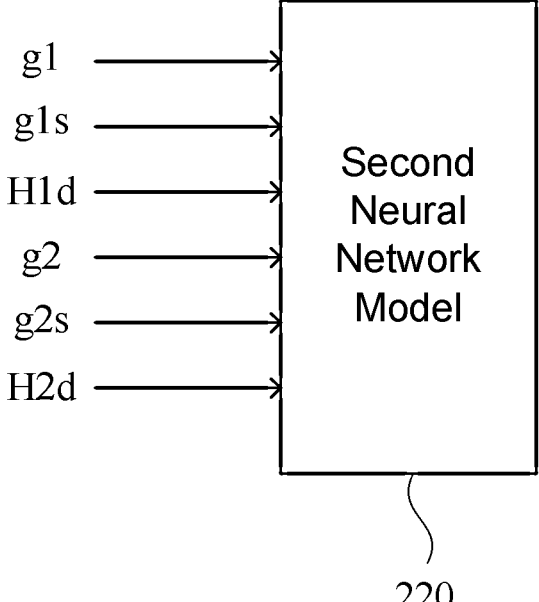
Fig. 6

DETECTION SYSTEM, COMPENSATION METHOD, AND COMPUTER READABLE MEDIUM FOR SEMICONDUCTOR SURFACE MORPHOLOGY

BACKGROUND OF THE INVENTION

Field of the Invention

The present disclosure relates to detection of semiconductor surface morphology, and more particularly to a compensation method of enhancing capability of reading surface morphology, a detection system and a computer-readable recording medium both for use with the compensation method.

Description of the Prior Art

Semiconductor manufacturing necessitates plenty of manufacturing processes and related detection. Semiconductor surface structures must be formed not only at required positions but also to take on required shapes and thus must be effectively monitored and controlled in the course of manufacturing to ensure high yield. Semiconductor surface morphology is not only rendered defective because of process defects but also affected by contact-enabled detection (such as a point-testing procedure using a probe) in the course of detection. For example, the contact-enabled detection using a probe leaves probe marks on contact pads of a semiconductor structure. Specifically speaking, the probe causes dents and bumps to surface morphology of the contact pads, and the extent of the area and depth of the probe marks will affect the quality of wire bonding during a subsequent packaging process. Therefore, regardless of whether they came into being in the course of manufacturing or detection, all the defects have to be effectively detected to prevent defective dice from proceeding to a back-end process.

Conventionally, semiconductor surface morphology is sensed with an optical measurement device using light interference technology. For example, when a surface under test has morphological height irregularity, measurement light reflecting off the surface under test and reference light reflecting off a reference surface mix to allow the optical measurement device to obtain interference signals of a reflection light spectrum because of an optical path difference. The interference signals undergo transformation (for example, Fourier Transform) with a mathematical model to obtain waveform signals manifesting power spectral density distribution within a frequency domain, and the waveform signals are known as spectral signals. The peaks in the spectral signals are for use in determining an optical path difference; thus, owing to the obtained optical path difference, it is feasible to determine the height of a detection point. Upon completion of the detection at all detection points of a target detection region, the semiconductor surface morphology of the target detection region is revealed.

However, waveform signals manifesting power spectral density distribution are likely to exhibit variability, such as skewness, dual wave packets, and multiple wave packets, in any one of the situations as follows: when a semiconductor structure being detected comprises a material of a high reflectance; and the semiconductor structure has a multilayer coating structure; and the detection points are located at the edges of the semiconductor structure. Many algorithms are used to analyze features of spectral signals but usually targeted at one single type of features, bringing no effective benefits to the use of the entire detection system. The variability features are likely to occur, and thus the peaks in the spectral signals are erroneously read by the detection system. Therefore, the detection results of the semiconductor surface morphology have a high error rate, keeping reliability low.

SUMMARY OF THE INVENTION

A detection system used for semiconductor surface morphology and a compensation method applicable to the detection system in some embodiments of the disclosure provide a learning training technique that prevents peaks in spectral signals from being erroneously read.

A detection system used for semiconductor surface morphology and a compensation method applicable to the detection system in some embodiments of the disclosure not only enhance the precision of determining semiconductor surface morphology but also enhance the reliability of the detection system.

According to some embodiments, the disclosure provides a compensation method applicable to a detection system used for semiconductor surface morphology, adapted to compensate a to-correct height corresponding to a to-correct spectral signal having variability, the compensation method comprising the steps of: providing a plurality of eigenvalues of the to-correct spectral signal to a first neural network model operated by a computation processing device to obtain a first feature information and providing the to-correct spectral signal to a second neural network model operated by the computation processing device to obtain a second feature information; and combining the first feature information about waveform features and the second feature information about compensation degree information to generate a waveform class information and a compensation information, the compensation information allowing the to-correct height to be corrected by the detection system to become a corrected height, wherein the first neural network model is trained according to a plurality of abnormal signals and eigenvalues corresponding to a plurality of normal signals respectively, and wherein the second neural network model is trained according to eigenvalues corresponding to the abnormal signals respectively, an abnormal height information, eigenvalues corresponding to the normal signals respectively, and a normal height information.

According to some embodiments, the first neural network model is trained based on using a plurality of abnormal eigenvalues corresponding to the abnormal signals manifesting variable spectral states and a plurality of normal eigenvalues corresponding to the normal signals manifesting invariable spectral states as input vectors and providing the input vectors to the first neural network model.

According to some embodiments, the second neural network model is trained based on using the abnormal signals, the corresponding abnormal eigenvalues, an corresponding abnormal height difference, the normal signals, the corresponding normal eigenvalues, and a corresponding normal height difference as input vectors and providing the input vectors to the second neural network model, wherein the abnormal height difference and the normal height difference are differences between a detected height corresponding to each signal and an actual height corresponding to the signal. The abnormal height information is the abnormal height difference. The normal height information is the normal height difference.

According to some embodiments, the second processing step further comprises a compensation control process. The compensation control process entails instructing the computation processing device to correct the to-correct height of the to-correct spectral signal when an extent of the correction made to the compensation information corresponding to the to-correct spectral signal exceeds a threshold.

According to some embodiments, during the training of the second neural network model, the input vector provided to the second neural network model is an input vector resulting from recombination of the to-correct spectral signal and additional spectral signals corresponding to a plurality of additional detection points respectively, and each of the signals manifesting variable spectral states corresponds to a detection point, with additional detection points defined within an additional scope in the vicinity of the detection point. Furthermore, the additional scope corresponds to the range of one detection point.

According to some embodiments, the second processing step further comprises a preprocessing process. The preprocessing process precedes the step of providing the input vector to the second neural network model and entails performing a DC component removing step, a signal amplifying step and a signal mean shifting step sequentially on each of all the spectral signals provided to the second neural network model.

According to some embodiments, the disclosure further provides a detection system used for semiconductor surface morphology, comprising an optical measurement device and the computation processing device. The optical measurement device scans a target detection region of an object under test with an illuminating light beam to obtain a plurality of interference signals formed by a reflection light reflecting off the object under test. The computation processing device receives and transforms the interference signals into a plurality of spectral signals not having variability and at least one to-correct spectral signal having variability. The computation processing device performs the compensation method such that a to-correct height corresponding to the at least one to-correct spectral signal is corrected to become a corrected height to correctly create surface morphology of the target detection region.

According to some embodiments, the disclosure further provides a nonvolatile computer-readable medium. The computer-readable recording medium stores a computer program. The computer program comprises a first neural network model trained with eigenvalues corresponding to a plurality of spectral signals and comprises a second neural network model trained with the spectral signals and height information corresponding thereto. The computer program is adapted to obtain a to-correct spectral signal based on surface morphology of an object under test, obtain and provide a plurality of signals eigenvalues of the to-correct spectral signal to the first neural network model to obtain a first feature information, provide the to-correct spectral signal to the second neural network model to obtain a second feature information, and combine the first feature information and the second feature information to obtain a compensation information related to the to-correct spectral signal and adapted to compensate a to-correct height corresponding to the to-correct spectral signal.

According to some embodiments, the disclosure further provides a detection system used for semiconductor surface morphology, comprising an optical measurement device, a morphological measurement device and a computation processing device. Owing to the morphological measurement device, standard objects under test provided at a user end (the surface morphology of each of the standard objects under test has a corresponding region within which the spectral signals look normal and abnormal) can train the neural network models spontaneously. The computation processing device compiles information about the spectral signals corresponding to the standard objects under test to build and train the neural network models. The optical measurement device scans a target detection region with an illuminating light beam and obtains a light interference state formed by a reflection light from the target detection region. The morphological measurement device obtains the actual height of the target detection region. The computation processing device is coupled to the optical measurement device and the morphological measurement device and configured to perform a first training step, a second training step, an analysis step and a compensation step. The first training step corresponds to the aforesaid way of training the first neural network model. The second training step corresponds to the aforesaid way of training the second neural network model. The analysis step entails obtaining a compensation information generated according to an abnormal feature contained in the to-correct spectral signal. The compensation step entails correcting, according to the compensation information, a to-correct height corresponding to the to-correct spectral signal to become a corrected height to correctly create surface morphology of the target detection region of the object under test.

Therefore, the spectral signals for use in evaluating semiconductor surface morphology can be compensated for regardless of whether they have errors or are wrong to not only preclude erroneous reading but also enhance the precision of determining the semiconductor surface morphology.

BRIEF DESCRIPTION OF THE DRAWINGS

FIG. 4 is a schematic view of a process flow of a compensation method applicable to the detection system used for semiconductor surface morphology according to some embodiments of the disclosure.

FIG. 6 is a schematic view of how to train the first neural network model and the second neural network model according to some embodiments of the disclosure.

DETAILED DESCRIPTION OF THE EMBODIMENTS

Figure 1:
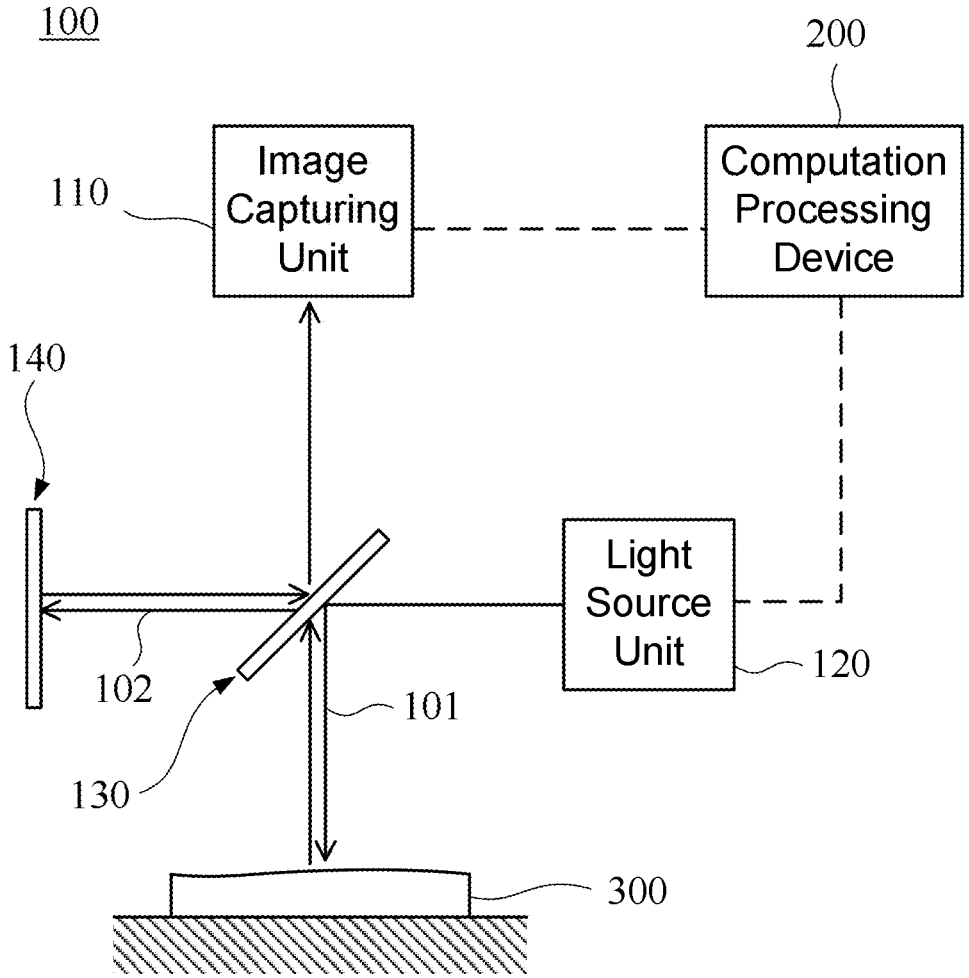
FIG. 1 is a schematic view of a detection system used for semiconductor surface morphology according to some embodiments of the disclosure.

Objectives, features, and advantages of the present disclosure are hereunder illustrated with specific embodiments, depicted with drawings, and described below.

In the disclosure, descriptive terms such as "a" or "one" are used to describe the unit, component, structure, device, module, portion, section or region, and are for illustration purposes and providing generic meaning to the scope of the present invention. Therefore, unless otherwise explicitly specified, such description should be understood as including one or at least one, and a singular number also includes a plural number.

In the disclosure, descriptive terms such as "include, comprise, have" or other similar terms are not for merely limiting the essential elements listed in the disclosure, but can include other elements that are not explicitly listed and are however usually inherent in the units, components, structures, devices, modules, portions, sections or regions.

In the disclosure, the terms similar to ordinals such as "first" or "second" described are for distinguishing or referring to associated identical or similar components or structures, and do not necessarily imply the orders of these components, structures, portions, sections or regions in a spatial aspect. It should be understood that, in some situations or configurations, the ordinal terms could be interchangeably used without affecting the implementation of the present invention.

An optical measurement device is often used to detect surface morphology. Examples of the optical measurement device include a measurement device that relies upon light beams reflecting off surface morphology, and a morphological measurement device (such as scanning electron microscope (SEM), atomic force microscopy (AFM) or scanning tunneling microscope (STM)) that operates slowly but detects surface morphology precisely. The morphological measurement device that operates slowly has another drawback, i.e., it is likely to damage the surface of objects under test.

To obtain detection results quickly, persons skilled in the art usually use the measurement device that relies upon light beams reflecting off surface morphology, for example, an optical measurement device (such as a white-light interferometer) with a reference mirror, or an optical measurement device (such as a spectrometer for measuring a through-silicon via (TSV)) having no reference mirror but directly using the surface of an object under test as a reference surface. The obtained light interference spectral signals of reflection light are transformed with an algorithm (for example, Fourier Transform) to obtain transformed spectral signals. Since an optical path difference giving rise to the interference phenomenon of reflection light is an important factor in phase changes in the light interference spectral signals, information about the optical path difference can be inferred from coordinate information about the peaks in a waveform upon transformation into spectral signals of a frequency domain, obtaining height information about a detection point (or illuminated region). The spectral signals free of any interference phenomenon indicate that the height information about the detection point is predetermined height information (i.e., the surface morphology is flat and free of height irregularity). Obtaining depth information by transformation of light interference signals into spectral signals is prior art and thus is, for the sake of brevity, not reiterated herein.

Referring to FIG. 1, there is shown a schematic view of a detection system used for semiconductor surface morphology according to some embodiments of the disclosure. An optical measurement device 100 provides an illuminating light beam 101 to scan (detection points, one by one, of) a target detection region of an object under test 300. The illuminating light beam 101 passes through a beam splitting unit 130 such that a portion of the illuminating light beam 101 forms a penetrating light beam 102 that falls on a reference mirror 140. Owing to the coaxial illumination generated by a light source unit 120 and the beam splitting unit 130, both the reflection light from the object under test 300 and a reference light from the reference mirror 140 can be captured by an image capturing unit 110 to become spectral signals, and the image capturing unit 110 can capture spectral signals having interference phenomenon. A computation processing device 200 is coupled to the light source unit 120 and the image capturing unit 110 of the optical measurement device 100 to perform scan control, receive spectral signals and perform subsequent signal analysis.

The optical measurement device 100 is a white-light interferometer or any optical measurement device for achieving a light interference phenomenon. FIG. 1 shows the white-light interferometer for exemplary purposes. The computation processing device 200 is provided either in the form of one single computer or multiple computers or in the form of one single computation processing module or multiple computation processing modules disposed in the entire detection system. The computation processing device 200 receives signals provided by the optical measurement device 100.

Figure 2:
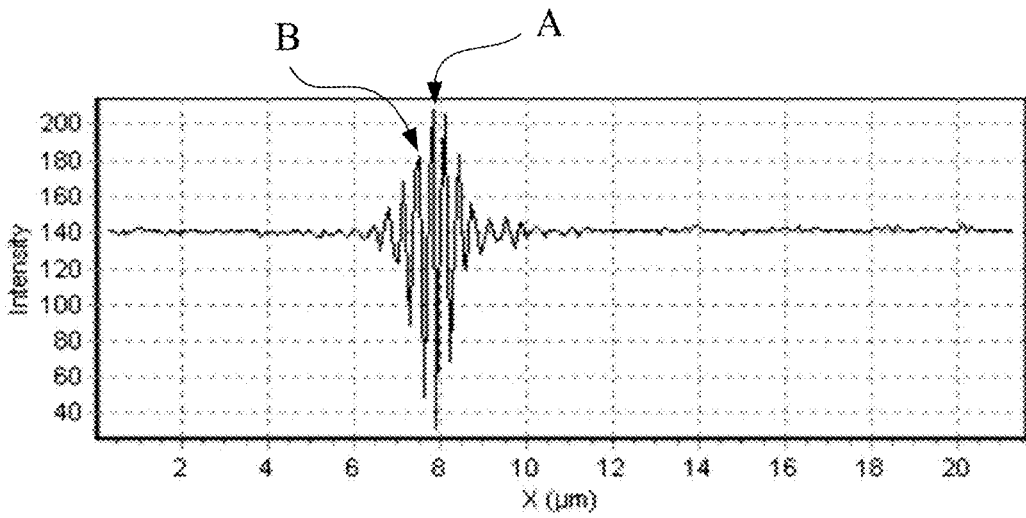
FIG. 2 is a schematic view of spectral signals with skewness.
Figure 3:
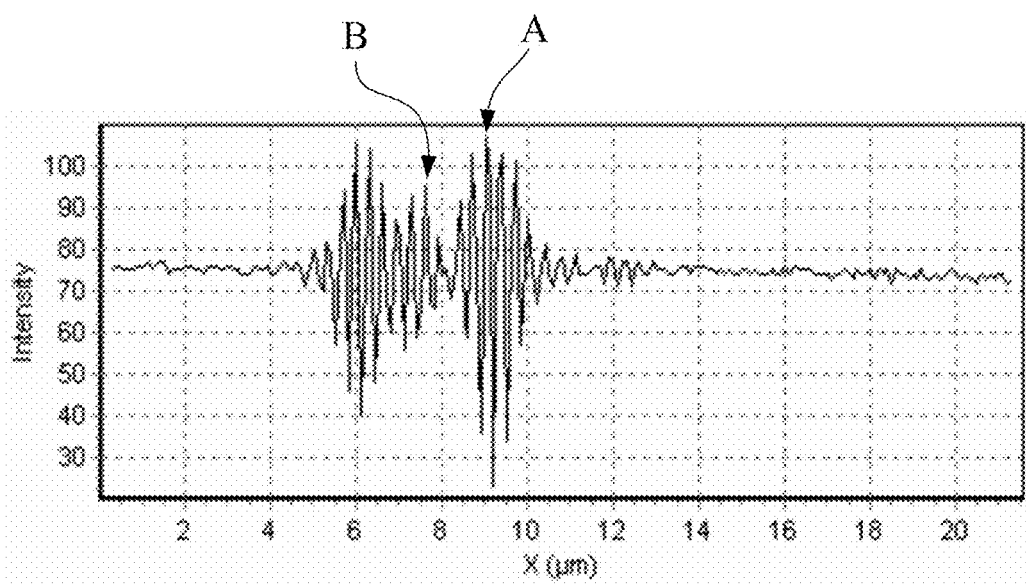
FIG. 3 is a schematic view of spectral signals with dual wave packets.

Every spectral signal generated according to some states of surface morphology is usually symmetrical. When a spectral signal is abnormal and thus is a variable spectral signal, algorithms for identifying peaks automatically to obtain optical path difference information cause the optical path difference information to be erroneously read, leading to erroneous assessment of the surface morphology. The abnormal, variable spectral signals have waveform-related features, such as skewness, dual wave packets, and multiple wave packets, typical of asymmetrical waveforms. Referring to FIG. 2, there is shown a schematic view of spectral signals with skewness. Referring to FIG. 3, there is shown a schematic view of spectral signals with dual wave packets. In FIG. 2, the arrow A points at the peak identified by an algorithm, but precise measurement (for example, using atomic force microscopy) reveals that the peak indicated by the arrow B represents the correct optical path difference information. Similarly, in FIG. 3, the arrow A points at the peak identified by an algorithm, but precise measurement (for example, using atomic force microscopy) reveals that the peak indicated by the arrow B represents the correct optical path difference information. Therefore, when a waveform manifests variability, the peak identified by an algorithm rarely carries the real height information of the detection point.

Waveform-related feature information is extracted from spectral signals with many feature extraction tools (algorithms) targeted at signals waveform. For example, waveform features in graphics are extracted through calculating the maximum, minimum and mean of the gray scale values in graphics with a graphic feature extraction method based on gray scale values. For another example, waveform features in graphics are extracted with a graphic feature extraction method (scale derivative) based on dimensional space through calculating a gradient values in graphics at different scales.

Waveform feature information is extracted from the spectral signals with the analysis tools. Additionally, the spectral signals obtained can be classified based on forms of interest, and the forms come with corresponding waveform feature information. The aforementioned analysis tools generally serve as the basis for classifying spectral signals. For example, in the situation where there are four types of the forms of interest, namely position of center of gravity, skewness, dual wave packets, and multiple wave packets, each form will have its respective eigenvalues. When it comes to general use, items of interest are compared or examined one by one to identify potential flaws, such as errors in surface morphology determination. The analysis tools are considered prior art, and the detailed analytical methods are therefore not elaborated upon herein.

In an embodiment of the disclosure, the eigenvalues are used to perform planning and/or further processing, increase or decrease classified items as needed, and further infer the eigenvalues of the spectral signals corresponding to each detection point in each class, for example, eigenvalues corresponding to the spectral signals of a waveform attributed to the skewness class, eigenvalues corresponding to the spectral signals of a waveform attributed to the dual wave packets class, and eigenvalues corresponding to the spectral signals of a waveform attributed to the multiple wave packets class.

For example, the aforesaid technique is employed to identify the spectral signals having variability and identify the spectral signals having no variability. For instance, a classification technique is as follows: if spectral signals manifest skewness, dual wave packets or multiple wave packets, the spectral signals will be classified as spectral signals having variability. Classified items attributed to a form of interest can be adjusted as needed (e.g., matching characteristics of an object under test).

Figure 5:
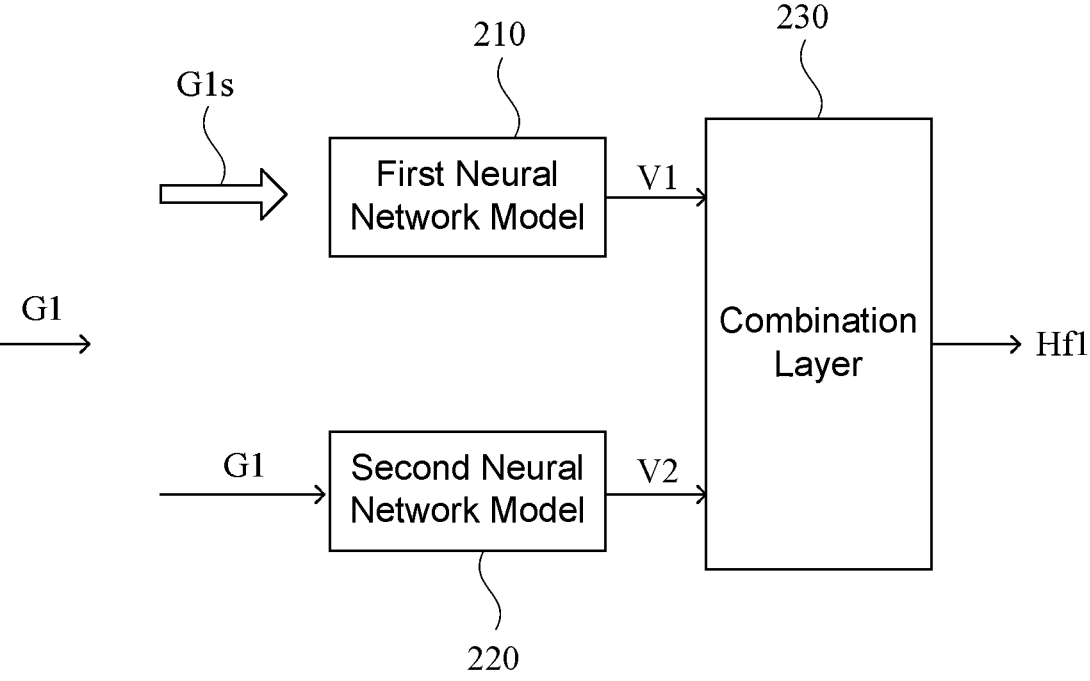
FIG. 5 is a schematic view of how to use a first neural network model and a second neural network model according to some embodiments of the disclosure.

Referring to FIG. 4, there is shown a schematic view of a process flow of a compensation method applicable to the detection system used for semiconductor surface morphology according to some embodiments of the disclosure. Referring to FIG. 5, there is shown a schematic view of how to use a first neural network model and a second neural network model according to some embodiments of the disclosure. Since erroneous or defective spectral signals are likely to cause information about an optical path difference to be erroneously read, the optical path difference information is height information of a detection point (or illuminated region), further causing semiconductor surface morphology to be erroneously read. Therefore, the compensation method is employed to compensate the height information (the to-correct height) corresponding to the spectral signals (to-correct spectral signals) having variability, allowing the detection system to correctly create surface morphology of the target detection region.

After a to-correct spectral signal G1 has been obtained, the to-correct spectral signal G1 and its correlated eigenvalues are provided to a corresponding neural network model. The compensation method comprises steps as follows:

Step S100: providing a plurality of eigenvalues G1$s$ corresponding to the to-correct spectral signal G1 to a first neural network model 210 and providing the to-correct spectral signal G1 to a second neural network model 220.

Step S200: providing a first feature information V1 outputted from the first neural network model 210 and a second feature information V2 outputted from the second neural network model 220 to a combination layer 230.

Step S300: generating a waveform class information and a compensation information. The compensation information is, for example, a compensation value Hf1 shown in FIG. 5 and adapted to enable the to-correct height to undergo compensation.

The eigenvalues provided to the first neural network model 210 are eigenvalues (for example, eigenvalues corresponding to the spectral signals are outputted from an analysis tool (algorithm) of skewness forms when classification items contain skewness forms) under selected classification items corresponding to the spectral signals respectively. The more the selected classification items are, the more eigenvalues corresponding to the spectral signals are generated and inputted to the first neural network model 210.

The first feature information V1 outputted from the first neural network model 210 represents identification information of the waveform of the to-correct spectral signal G1. The identification information correlates with the selected classification items. The first feature information V1 and the subsequent second feature information V2 are combined to provide the basis for numerical regression to obtain the compensation information.

The second feature information V2 outputted from the second neural network model 220 is for use in determining compensation degree, i.e., the compensation degree information corresponding to the to-correct spectral signal G1. The second neural network model 220 thus trained is for use in correctly reading signals and determining the compensation degree information (magnitude of a compensation value). Given the joint operation of the first neural network model 210 and the second neural network model 220 and the combination of the first feature information V1 and the second feature information V2, the course of the generation of the compensation information depends on the waveform types of signals. Subsequently, numerical regression involves generating the waveform class information (waveform types) and compensation information of the to-correct spectral signal G1. Therefore, the reading of various signal states is efficient, and precise compensation information can be provided.

The combination layer 230 contains combination features by performing a concatenation operation performed on the first feature information V1 and the second feature information V2. As mentioned before, through the concatenation of features, the detection system obtains accurate compensation information of the height of the surface morphology according to the waveform types of the signals.

The to-correct spectral signal G1 also corresponds to a detected height (i.e., conventionally obtained information). After the compensation value Hf1 corresponding to the to-correct spectral signal G1 has been obtained, a height difference (a to-correct height) corresponding to the spectral signals (to-correct spectral signal G1) with variability can be compensated for and thus transformed into a corrected height. Therefore, after all the to-correct spectral signals G1 have been corrected, the detection system can present the correct surface morphology of the target detection region.

Furthermore, not only are spectral signals with variability compensated for (to enhance determination efficiency), but the computation processing device 200 (as shown in FIG. 1) can also execute the compensation control process. The computation processing device 200 performs the compensation operation on the detected height corresponding to the to-correct spectral signal G1 only when the extent of the correction made to the compensation information corresponding to the to-correct spectral signal G1 exceeds a threshold (for example, when the absolute value of the compensation value Hf1 exceeds a threshold)

Referring to FIG. 6, there is shown a schematic view of how to train the first neural network model and the second neural network model according to some embodiments of the disclosure.

The training of the first neural network model involves providing information about variable spectral states and information about invariable spectral states to the first neural network model for undergoing training. Specifically speaking, a plurality of abnormal eigenvalues g1$s$ corresponding to a plurality of abnormal signals g1 and a plurality of normal eigenvalues g2$s$ corresponding to a plurality of normal signals g2 are used as input vectors, and the input vectors are provided to the first neural network model for undergoing training process. The first neural network model is, for example, a multilayer perceptron (MLP) or any other neural network models which demonstrate equal or similar levels of learning capability with respect to signal waveforms.

Given the use of some selected waveform analysis tools, waveforms of signals can be identified. For example, when (for example, high or low) magnitude of kurtosis is a concern, a related waveform analysis tool is an algorithm for calculating the kurtosis, generating flat or steep waveforms. For example, the waveform analysis tool corresponding to (for example, high, moderate or low) magnitude of skewness is an algorithm for calculating the skewness, generating Gaussian-distributed, left-skewed or right-skewed waveforms. The objective of the training of the first neural network model is to enable the first neural network model to identify waveforms according to eigenvalues of signals. When a multilayer perceptron (MLP) functions as the first neural network model, the MLP undergoes training through the minimization of a loss function, and in consequence the output of the MLP thus trained is an activation level or an activation vector for use in identifying waveforms, i.e., the first feature information.

The training of the second neural network model involves using information about variable spectral states, and a corresponding abnormal height difference (i.e., a type of abnormal height information), as well as information about invariable spectral states, and a corresponding normal height difference (i.e., a type of normal height information) as input vectors, which are provided to the second neural network model for undergoing training. The spectral signals from a detection point are obtained, and peaks of the spectral signals are identified with an algorithm to directly obtain a height (regardless of whether the height thus obtained is correct or not), i.e., a detected height. Likewise, a height related to the detection point and obtained with a measurement device (such as scanning electron microscope (SEM), atomic force microscopy (AFM) or scanning tunneling microscope (STM)) is regarded as the actual height, and the height difference is the difference between the detected height and the actual height. Specifically, the abnormal signals g1, the corresponding abnormal eigenvalues g1s, and the corresponding abnormal height difference H1d, as well as the normal signals g2, the corresponding normal eigenvalues g2s, and the corresponding normal height difference H2d are used as input vectors and provided to the second neural network model for undergoing a training process.

In the course of the training of the second neural network model, the learning and training of the second neural network model in terms of signal reading takes place through the use of the actual height, the detected height and the waveforms of the corresponding spectral signals such that feature vectors thus analyzed are conducive to the outcome of subsequent numerical regression; thus, the second neural network model is capable of outputting a corresponding compensation degree information to each variable spectral state, and each output vector is an embedding vector for identifying a corresponding compensation information, i.e., the second feature information, according to the waveforms. The second neural network model is, for example, a fully convolutional networks (FCN), a residual neural network (ResNet) or any other neural network models (for example, CNN, MCNN, MCDCNN, TWIESN, ENCODER, MLP, INCEPTION, TLENET, HIVE together with programs)

which demonstrate equal or similar levels of learning capability with respect to signal waveforms.

The abnormal height difference H1d is one of the types of abnormal height information, and the abnormal height information is not only the difference between the detected height and the actual height but is also the actual height. The normal height difference H2d is one of the types of normal height information, and the normal height information is not only the difference between the detected height and the actual height but is also the actual height (The difference may be zero or tiny, because it relates to the normal height information.) With the height information being the actual height, the second neural network model can learn height information corresponding to various spectral signals and thus determine subsequent compensation degree information.

Specifically, in the course of training, the spectral signals, waveform features, detected height and actual height at a detection position are provided to train a neural network model. The outputs of two neural network models combine to match with a combined vector (but not to match with a vector outputted from one single neural network model) by the waveform features and the compensation information correlated with the detected height and the actual height. Thus, the combined vectors can share all features. Therefore, two neural network models capable of obtaining precise compensation information can be trained through the allocation of weights of the features in the course the training shared by two neural network models.

Furthermore, in some other embodiments, in the course of the training and in the course of the use of the second neural network model, information near each detection point recombines to form a new detection point input information (with the recombination being restricted to the spectral signals). Each detection point and the information of a plurality of additional detection points in the vicinity of the detection point together function as a new input vector. Therefore, the spectral signals of the detection point and additional spectral signals of each additional detection point undergo training within models of matching dimensions by means of data structure compilation. The new input vector further comprises information about additional detection points in the vicinity of the main detection point. Since the additional detection points are near the main detection point, height-related morphology information about the main detection point enriches the learning and training of the second neural network model. The additional detection points are defined as the scope within which a detection point lies in the vicinity of the main detection point within the target detection region. When the training entails using recombined detection point input information, in the course of the use of the trained second neural network model (for example, step S100), the to-correct spectral signal is a recombined input vector, and the recombined data structure matches a trained model of the same dimensions.

Furthermore, in some other embodiments, spectral signals undergo a preprocessing process, and then the spectral signals functioning as components of input vectors are provided to the second neural network model. The preprocessing process amplifies the signals. The preprocessing process entails sequentially carrying out the steps as follows: DC component removing step, signal amplifying step and signal mean shifting step.

The DC component removing step eliminates a time-dependent constant term, typically with a first derivative or by subtracting the mean. In addition, this step can also mitigate certain factors that might cause calculation errors, such as the batwing effect.

The signal amplifying step involves converting most negative values to positive, typically by using squaring to achieve signal amplification.

The signal mean shifting step involves further filtering out irrelevant information, for example, an algorithm (Mean Shift) is used to calculate the intensity value of each signal, from which a shift value (the shift value is the average of the intensity values of all the signals, and the shift value corresponds to the intended extent of filtration) is subtracted. This separates positive and negative signals, achieving the filtration effect of retaining only the main peaks of each spectral signal as positive values while others are negative. The original activation function (ReLU) is modified to an algorithm (LeakyReLU), for example, setting the slope of the negative component of LeakyReLU to a very small positive value, such as 0.01, to allow negative values to have some influence during training. Thus, negative-value data can still contribute to the training process, effectively enhancing the performance of the models in handling the data with noise.

Figure 7:
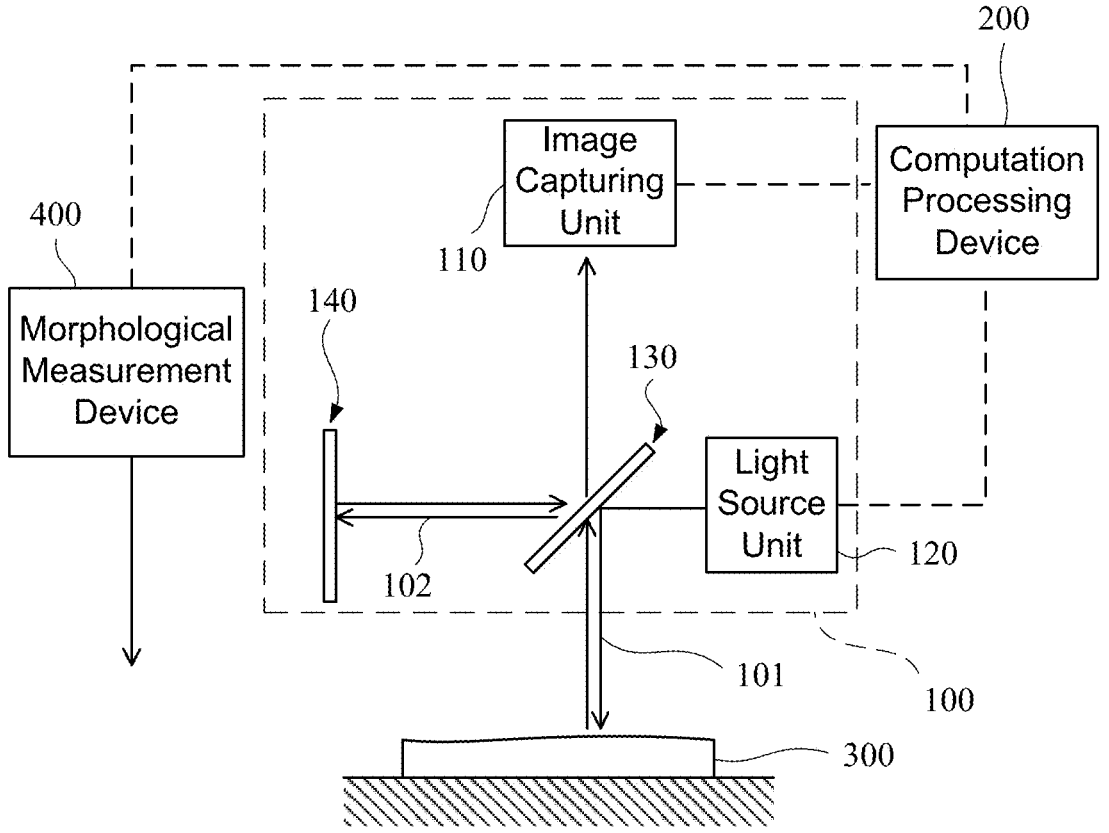
FIG. 7 is a schematic view of a detection system used for semiconductor surface morphology according to another embodiment of the disclosure.

Referring to FIG. 7, there is shown a schematic view of a detection system used for semiconductor surface morphology according to another embodiment of the disclosure. In this embodiment, the detection system comprises the optical measurement device 100, the morphological measurement device 400 and the computation processing device 200.

The optical measurement device 100 scans the target detection region (a region on the object under test 300) with the illuminating light beam 101 and obtains a light interference state formed by the reflection light from the target detection region. The morphological measurement device 400 obtains the actual height of the target detection region. The computation processing device 200 is coupled to the optical measurement device 100 and the morphological measurement device 400. The computation processing device 200 carries out the steps as follows: first training step, second training step, analysis step and compensation step.

Owing to the morphological measurement device 400 in the embodiment shown in FIG. 7, standard objects under test provided at a user end (i.e., a system operation end, and the surface morphology of each of the standard objects under test has a corresponding region within which the spectral signals look normal and abnormal) can train the neural network models spontaneously. The computation processing device 200 compiles information about the spectral signals corresponding to the standard objects under test to build and train the neural network models.

The first training step corresponds to the aforementioned training method of training the first neural network model. Specifically, the first training step is performed on condition that a plurality of standard objects under test are each provided to the optical measurement device. The computation processing device 200 obtains a light interference state from the optical measurement device 100, transforms the light interference state into an abnormal signal of each of the standard objects under test corresponding to variable spectral states, and transforms the light interference state into a normal signal of each of the standard objects under test corresponding to invariable spectral states. The computation processing device 200 uses the abnormal signals, a plurality of abnormal eigenvalues corresponding to the abnormal signals, the normal signals, and a plurality of normal eigenvalues corresponding to the normal signals as input vectors and provides the input vectors to the first neural network model for undergoing training.

The second training step corresponds to the aforesaid way of training the second neural network model. Specifically speaking, the second training step is performed on condition that the plurality of standard objects under test are each provided to the optical measurement device. The computation processing device 200 causes the morphological measurement device 400 to obtain an actual height of the surface morphology of each standard object under test. The computation processing device 200 obtains a light interference state from the optical measurement device 100 and transforms the light interference state into an abnormal signal of each of the standard objects under test corresponding to variable spectral states, a corresponding abnormal eigenvalue and a corresponding abnormal height difference. The computation processing device 200 obtains a light interference state from the optical measurement device 100 and transforms the light interference state into a normal signal of each of the standard objects under test corresponding to invariable spectral states, a corresponding normal eigenvalue and a corresponding normal height difference. The computation processing device 200 uses the abnormal signals, normal signals, abnormal eigenvalues, normal eigenvalues, abnormal height differences and normal height differences as input vectors and provides the input vectors to the second neural network model for undergoing training to obtain the compensation information corresponding to each variable spectral state. The abnormal height difference and the normal height difference are differences between a detected height corresponding to each signal and an actual height corresponding to the signal.

The analysis step is performed on condition that an object under test exists. The computation processing device 200 causes the optical measurement device 100 to obtain a plurality of interference signals formed by a reflection light within the target detection region of the object under test, transforms the interference signals into a plurality of spectral signals, provides the to-correct spectral signal to the first neural network model and the second neural network model when at least one to-correct spectral signal having variability exists in the spectral signals to obtain a first feature information that includes waveform class information and a second feature information that includes compensation degree information, and combines the first feature information and the second feature information to generate a compensation value according to an abnormal feature contained in the to-correct spectral signal.

In the compensation step, the computation processing device 200 corrects, according to the compensation information, a to-correct height corresponding to the to-correct spectral signal to become a corrected height, thereby accurately generating the surface morphology of the target detection region of the object under test.

In the course of the training of a neural network, the amount of the required training is assessed according to the quality of the obtained spectral signals (for example, whether the signals impose any extra effect on the waveforms for an environmental reason, whether the actual height is correct, and whether the feature information of the signals is complete). Moreover, the training terminates as soon as the probability of a mean square error resulting from training approaches zero or the number (for example, set to 50 or any other number) of the training sessions in the latest specific training cycle increases no more. For instance, the two neural network models are trained according to five selected probe mark positions, and each neural network model is trained with around 500,000 pieces of data (a training cycle comprises 300 training sessions), but the disclosure is not limited thereto.

The aforesaid various functions and computations are carried out with software through storing a computer program in a nonvolatile computer-readable medium and executing the computer program. The computer program is stored in a medium. The computer program comprises a plurality of commands whereby electronic devices (such as various computer apparatuses, network apparatuses or any other electronic apparatuses) or processors perform the compensation method used for semiconductor surface morphology in the embodiments of the disclosure.

In conclusion, the learning, training and implementation of two combinational neural network models enable accurate determination of spectral signals and provide the necessary compensation for height information, thereby enhancing the precision of the detection of semiconductor surface morphology and enhancing the reliability of the detection system.

The present disclosure is illustrated by various aspects and embodiments. However, persons skilled in the art understand that the various aspects and embodiments are illustrative rather than restrictive of the scope of the present disclosure. After perusing this specification, persons skilled in the art may come up with other aspects and embodiments without departing from the scope of the present disclosure. All equivalent variations and replacements of the aspects and the embodiments must fall within the scope of the present disclosure. Therefore, the scope of the protection of rights of the present disclosure shall be defined by the appended claims.

What is claimed is:

1. A compensation method for a detection system used for semiconductor surface morphology, adapted to compensate a to-correct height corresponding to a to-correct spectral signal having variability, the compensation method comprising the steps of:

providing a plurality of eigenvalues of the to-correct spectral signal to a first neural network model operated by a computation processing device to obtain a first feature information and providing the to-correct spectral signal to a second neural network model operated by the computation processing device to obtain a second feature information; and combining the first feature information about waveform features and the second feature information about compensation degree information to generate a waveform class information and a compensation information, the compensation information allowing the to-correct height to be corrected by the detection system to become a corrected height, wherein the first neural network model is trained according to a plurality of abnormal signals and eigenvalues corresponding to a plurality of normal signals respectively, and wherein the second neural network model is trained according to eigenvalues corresponding to the abnormal signals respectively, an abnormal height information, eigenvalues corresponding to the normal signals respectively, and a normal height information.

2. The compensation method of claim 1, wherein the first neural network model is trained based on using a plurality of abnormal eigenvalues corresponding to the abnormal signals manifesting variable spectral states and a plurality of normal eigenvalues corresponding to the normal signals manifesting invariable spectral states as input vectors and providing the input vectors to the first neural network model.

3. The compensation method of claim 2, wherein the second neural network model is trained based on using each of the abnormal signals along with the corresponding abnormal eigenvalues and a corresponding abnormal height difference, as well as each of the normal signals along with the corresponding normal eigenvalues and a corresponding normal height difference as input vectors and providing the input vectors to the second neural network model, wherein the abnormal height difference and the normal height difference are differences between a detected height corresponding to each signal and an actual height corresponding to the signal.

4. The compensation method of claim 3, further comprising a compensation control process that entails instructing the computation processing device to correct the to-correct height of the to-correct spectral signal when an extent of the correction made to the compensation information corresponding to the to-correct spectral signal exceeds a threshold.

5. The compensation method of claim 3, wherein, during the training of the second neural network model, the input vector provided to the second neural network model is an input vector resulting from recombination of the to-correct spectral signal and additional spectral signals corresponding to a plurality of additional detection points respectively, wherein the to-correct spectral signal corresponds to a detection point, and the additional detection points are defined within an additional scope in the vicinity of the detection point.

6. The compensation method of claim 5, wherein the additional scope corresponds to the range of one detection point.

7. The compensation method of claim 1, further comprising a preprocessing process that precedes the step of providing the input vector to the second neural network model and entails performing a DC component removing step, a signal amplifying step and a signal mean shifting step sequentially on each of all the spectral signals provided to the second neural network model.

8. The compensation method of claim 7, wherein the first neural network model is a multilayer perceptron (MLP), and the second neural network model is a fully convolutional network (FCN) or a residual neural network (ResNet).

9. A detection system used for semiconductor surface morphology, comprising:

an optical measurement device for scanning a target detection region of an object under test with an illuminating light beam to obtain a plurality of interference signals formed by a reflection light reflecting off the object under test; and a computation processing device for receiving and transforming the interference signals into a plurality of spectral signals not having variability and at least one to-correct spectral signal having variability, wherein the computation processing device performs the compensation method of claim 1 such that a to-correct height corresponding to the at least one to-correct spectral signal is corrected to become a corrected height to correctly create surface morphology of the target detection region.

10. A detection system used for semiconductor surface morphology, comprising:

an optical measurement device for scanning a target detection region with an illuminating light beam and obtaining a light interference state formed by a reflection light from the target detection region;

a morphological measurement device for obtaining an actual height of the target detection region; and a computation processing device coupled to the optical measurement device and the morphological measurement device and configured to perform:

a first training step, performed on condition that a plurality of standard objects under test are each provided to the optical measurement device, wherein the computation processing device obtains a light interference state from the optical measurement device, and transforms the light interference state into an abnormal signal of each of the standard objects under test, the abnormal signal having a variable spectral state, and transforms the light interference state into a normal signal of each of the standard objects under test, the normal signal having an invariable spectral state, and uses a plurality of abnormal eigenvalues corresponding to the abnormal signals and a plurality of normal eigenvalues corresponding to the normal signals as input vectors, and providing the input vectors to a first neural network model for undergoing training;

a second training step, performed on condition that the standard objects under test are each provided to the optical measurement device, wherein the computation processing device cooperates with the morphological measurement device to obtain an actual height of surface morphology of each of the standard objects under test, and obtains a light interference state from the optical measurement device, transforming the light interference state into the abnormal signals having variable spectral states of the standard objects under test, a corresponding abnormal eigenvalue, and a corresponding abnormal height difference, wherein the computation processing device obtains a light interference state from the optical measurement device, and transforms the light interference state into the normal signals having invariable spectral states of the standard objects under test, a corresponding normal eigenvalue, and a corresponding normal height difference, wherein the computation processing device uses the abnormal signals, normal signals, abnormal eigenvalues, normal eigenvalues, abnormal height difference and normal height difference as input vectors, and providing the input vectors to a second neural network model for undergoing training, wherein the abnormal height difference and the normal height difference are differences between a detected height of each signal and the actual height of the signal;

an analysis step, performed on condition that an object under test exists, wherein the computation processing device allows the optical measurement device to obtain a plurality of interference signals formed by a reflection light within the target detection region of the object under test, and transforms the interference signals into a plurality of spectral signals, the computation processing device provides the to-correct spectral signal to the first neural network model and the second neural network model when at least one to-correct spectral signal having variability exists in the spectral signals to obtain a first feature information that includes waveform class information and a second feature information that includes compensation degree information, and the computation processing device combines the first feature information and the second feature information to generate a compensation information according to an abnormal feature contained in the to-correct spectral signal; and a compensation step, wherein the computation processing device corrects according to the compensation information, a to-correct height corresponding to the to-correct spectral signal to become a corrected height to correctly create surface morphology of the target detection region of the object under test.

11. The detection system of claim 10, wherein the morphological measurement device is a scanning electron microscope (SEM), atomic force microscopy (AFM) or scanning tunneling microscope (STM).

12. The detection system of claim 10, wherein the optical measurement device is a white-light interferometer.

13. The detection system of claim 10, wherein the computation processing device is further configured to instruct, in the analysis step, the computation processing device to perform the compensation step on the to-correct height of the to-correct spectral signal when an extent of the correction made to the compensation information corresponding to the to-correct spectral signal exceeds a threshold.

14. The detection system of claim 10, wherein, in the second training step, the input vector provided to the second neural network model is an input vector resulting from recombination of the to-correct spectral signal and additional spectral signals corresponding to a plurality of additional detection points respectively, with the to-correct spectral signal corresponding to a detection point, with the additional detection points defined within an additional scope in the vicinity of the detection point.

15. The detection system of claim 14, wherein the additional scope corresponds to the range of one detection point.

16. The detection system of claim 10, wherein, in the second training step and the analysis step, the computation processing device is further configured to perform a preprocessing process before the step of providing the input vector to the second neural network model, and the preprocessing process entails performing a DC component removing step, a signal amplifying step and a signal mean shifting step sequentially on each of all the spectral signals provided to the second neural network model.

17. The detection system of claim 16, wherein the first neural network model is a multilayer perceptron (MLP), and the second neural network model is a fully convolutional network (FCN) or a residual neural network (ResNet).

* * * * *